United States Patent

[11] 3,599,693

| [72] | Inventor | Josef Bucheli |
| | | Herrliberg, Switzerland |
| [21] | Appl. No. | 835,389 |
| [22] | Filed | June 23, 1969 |
| [45] | Patented | Aug. 17, 1971 |
| [73] | Assignee | Tuflex A.G. |
| | | Glattbrugg, Switzerland |
| [32] | Priority | Apr. 30, 1969 |
| [33] | | Switzerland |
| [31] | | 6681/69 |

[54] ANCHORING DEVICE FOR SECURING OBJECTS TO A C-CROSS SECTION BAR
6 Claims, 15 Drawing Figs.

[52] U.S. Cl. .................................................. 151/41.75
[51] Int. Cl. .................................................. F16b 39/28
[50] Field of Search .......................................... 151/41.75, 41.71; 85/80, 81, 83, 84; 24/73 BC, 73 P, 73 R

[56] References Cited
UNITED STATES PATENTS

| 2,244,976 | 6/1941 | Tinnerman | 85/80 |
| 2,531,352 | 11/1950 | Churchill | 24/73 BC |
| 2,836,215 | 5/1958 | Rapata | 85/80 |
| 2,836,216 | 5/1958 | Rapata | 151/41.75 |
| 2,944,313 | 7/1960 | Reiland | 151/41.75 |
| 3,242,543 | 3/1966 | Adams | 24/73 P |
| 3,242,690 | 3/1966 | Kettell | 24/73 B |
| 3,357,064 | 12/1967 | Munse | 151/41.75 |
| 3,358,551 | 12/1967 | Seckerson | 85/80 |
| 3,360,832 | 1/1968 | Seckerson | 24/73 BC |
| 3,429,601 | 2/1969 | Bremers | 151/41.75 |

FOREIGN PATENTS

| 602,540 | 5/1948 | Great Britain | 151/41.75 |
| 973,117 | 10/1964 | Great Britain | 151/41.71 |
| 40,199 | 7/1965 | Germany | 151/41.75 |
| 1,318,824 | 1/1963 | France | 85/80 |
| 1,494,306 | 7/1967 | France | 151/41.75 |

*Primary Examiner*—Marion Parsons, Jr.
*Attorney*—McGlew and Toren

ABSTRACT: An anchoring device, for the disengageable securing of objects to a channel shape bar having inturned lips on its flanges defining a slot, comprises a plastic shell having a rectangular cross section and a central bolt-receiving bore. The shell has a neck portion with two opposite edges offset inwardly to an interspacing substantially equal to the width of the bar slot. At least one slot extends parallel to the offset edges into the neck portion to provide compressibility of the nut for pressing of the shell into the bar with the offset edges parallel to the edges of the bar slot. The offset edges form respective shoulders engageable beneath the lips of the bar. The bore may receive an internally fitted sleeve to be anchored in the shell.

PATENTED AUG 17 1971 3,599,693

INVENTOR
Josef Bucheli by
McGlew & Toren
ATTORNEYS.

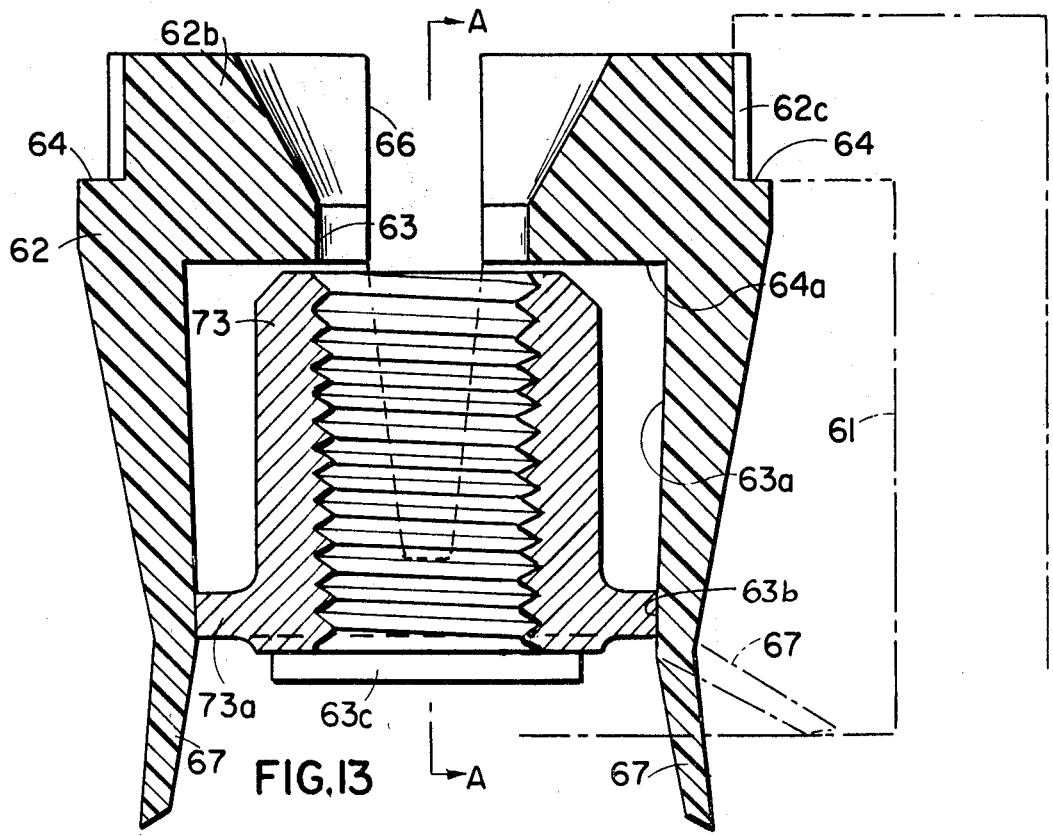
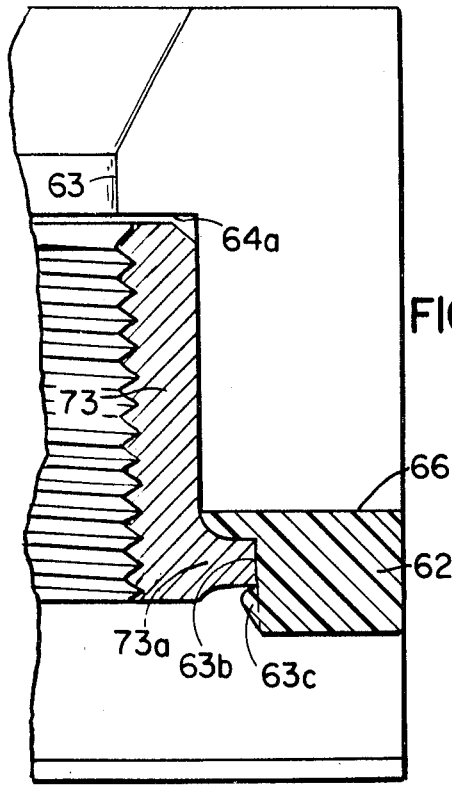
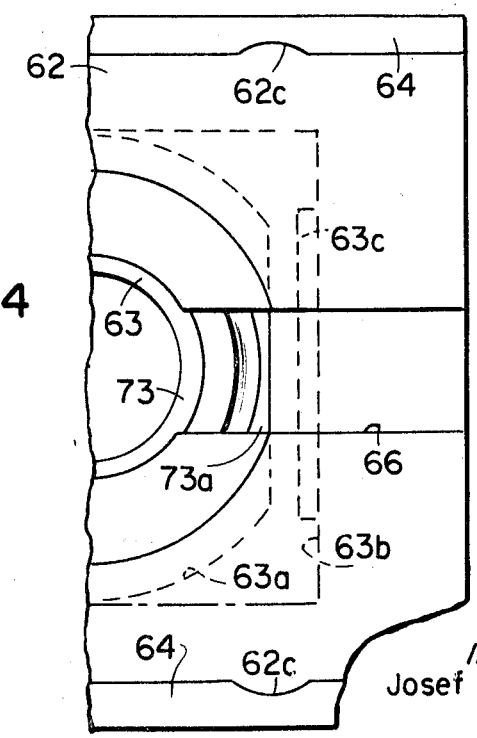

3,599,693

ANCHORING DEVICE FOR SECURING OBJECTS TO A C-CROSS SECTION BAR

BACKGROUND OF THE INVENTION

In electrical installations, particularly in the construction of switchboards, it is customary to secure holding clips, for cables, cable ducts, terminal blocks, etc., on hollow section bars in a disengageable manner, the bars having usually a C-cross section. In the known arrangements of this type, a threaded nut is provided and is pushed from one end of the bar into the latter, or is inserted at an especially recessed or widened point frontally into the bar. A fastening bolt is threaded into the nut so that the nut is clamped detachably on the edge parts of the bar defining the bar slot, and may be held firmly, for example by means of a lock nut. Similar anchoring devices are known in ceiling constructions including an inner ceiling formed of plates or panels.

The essential disadvantages of the known anchoring devices are that the bars must be freely accessible at least at one end when the above mentioned nut must be inserted laterally into the bar. If a frontal insertion of the nuts is to be possible, the bar either must have a specially recessed area of point for the introduction of the nuts or the nuts must have a cross section such that they can be introduced in a certain position into the bar slot and can be no longer removed frontally from the bar after the nuts have been turned, for example through 90°. However, the nut is secured only against falling out after it has been fixed on the bar. The assemblies are correspondingly cumbersome.

SUMMARY OF THE INVENTION

This invention relates to anchoring devices for the disengageable fastening of objects on a hollow profile bar and, more particularly, to an anchoring arrangement in which the disadvantages of the prior art are avoided.

In accordance with the invention, a plastic nut or shell with a rectangular cross section is provided with a neck portion with two opposite edges offset inwardly to an interspacing substantially equal to the width of the bar slot. This neck portion has at least one slot extending parallel to these offsets and inwardly beyond the neck portion, in such a way that the shell, with the offsets of the neck portion parallel to the edges of the bar slot, can be so pressed frontally into the bar that the shoulders, formed by the offsets, extend beneath the lips or edge portions of the bar slot.

An offset neck portion of the pressed-in shell is arranged in the bar slot, and prevents the shell from turning. The shoulders, extending beneath the slot-defining edge portions of the bar, prevent the shell from falling accidentally out of the bar. The slot in the shell, extending beyond the neck portion, provides, together with the characteristic elasticity of the plastic material, for the introduction of the projecting shoulders, which are spaced further apart laterally than the slot width, into the hollow of the bar.

If the slots are staggered laterally with respect to the axis of the shell, this prevents that a bolt, inserted into the bore of the shell, can be pressed by transverse forces into the slot and thus moved out of its axial position. However, this can be prevented also by providing the central bore of the shell with an offset portion, the narrower portion being arranged in the range of the neck portion, and by inserting into the remaining part of the bore a metal sleeve having an internal thread and whose outer circumference has means for preventing the sleeve from turning in the plastic shell. Projections integral with the nut and extending transverse to the axis of the nut are arranged on the shell and permit axial pressing of the neck portion into the center bore of the nut, while preventing the part inserted into the neck from falling out of the shell again.

The internally threaded sleeve insert can be a relatively long cylindrical sleeve with a polygonal flange arranged in a suitable widened portion of the central bore, one end of the sleeve bearing on the inner shoulder formed by the offset in the shell bore and the other end of the sleeve being designed as a polygonal flange bearing on a projection of the shell engaging this flange from the top. The polygonal flange, acting to restrain turning of the shell, could also extend over the entire length of the sleeve insert. The length of this polygonal sleeve can be less than the axial spacing of the shell projections from the inner shoulder formed by the offset of bore. When the fastening bolt is screwed into the shell, this sleeve, having the form of a metal nut, will be pulled automatically toward the inner shoulders.

An object of the invention is to provide an improved anchoring device for disengageably securing objects to a channel shaped bar having inturned lips on its flange defining a slot.

Another object of the invention is to provide such an anchoring device in the form of a plastic shell having a rectangular cross section and a central bolt-receiving bore, with the shell having a neck portion with two opposite edges offset inwardly to an interspacing substantially equal to the width of the bar slot.

A further object of the invention is to provide such an anchoring device in which the shell is formed with at least one slot extending parallel to the offset edges into the neck portion to provide compressibility of the shell for pressing of the shell axially into the bar with the offset edges parallel to the edges of the bar slot.

Another object of the invention is to provide such an anchoring device in which the offset edges form respective shoulders engageable beneath the lips of the bar.

A further object of the invention is to provide such an anchoring device in which an internally threaded metal sleeve is inserted into the bolt-receiving bore of the shell and restrained against turning relatively to the shell.

For an understanding of the principles of the invention, reference is made to the following description of typical embodiments thereof as illustrated in the accompanying drawings.

BRIEF DESCRIPTION OF THE DRAWINGS

In the Drawings:

FIG. 13 is a greatly enlarged axial section through a plastic shell, embodying the invention, and having an internally threaded metal sleeve inserted thereinto;

FIG. 14 is a sectional view taken on the line A-A of FIG. 13, but illustrating only one half of the shell; and FIG. 15 is a top plan view corresponding to FIG. 14.

DESCRIPTION OF THE PREFERRED EMBODIMENTS

Figure 1:
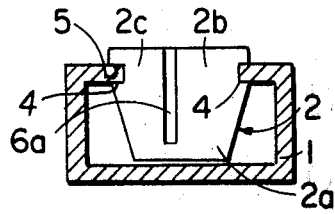
FIGS. 1 and 2 are, respectively, a cross-sectional view and a top plan view of a channel shaped bar with an anchoring shell pressed thereinto.
Figure 2:
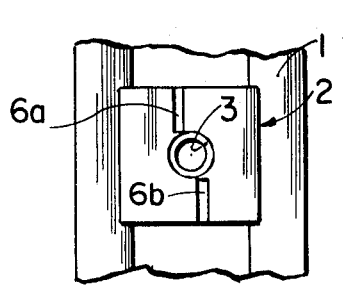

Referring first to FIGS. 1 and 2, a hollow section bar 1, such as a channel shaped bar having inturned lips on its flanges defining a slot, receives a plastic rectangular cross section anchoring shell 2 formed with a central bore 3. The bore 3 is a threaded bore, into which there can be threaded a fastening bolt which has not been shown. However, bore 3 also can be formed with axially extending ribs into which a threaded bolt can its own thread. Bar 1 may be formed of either metal or plastic, while shell 2 is formed of a plastic composition material or synthetic resin, for example, a polyamide.

Shell 2 has a rectangular and preferably square cross section, and the axial height of the main body 2a of the shell is slightly less than the inside height of bar 1. Shell 2 has a neck portion 2b with two opposite edges offset inwardly to an interspacing substantially equal to the width of the slot in bar 1. These offset edges form shoulders 4. A head portion 1c of shell 2 forms supporting surfaces 5 opposite shoulders 4 and spaced by the thickness of the lips of bar 1. The side surfaces of main body 2a of shell 2, adjoining the shoulders 4, are inclined obliquely toward the inside.

Shell 2 is formed with slots 6a and 6b extending from the head portion and parallel to the offset edges of the neck portion. These slots extend from opposite faces of nut 2, but are on different sides of the shell axis, the slots 6a and 6b extending up to the bore 3. Slots 6a and 6b extend far into the main body 2a of the shell 2, and thus make the nut elastically flexible in a transverse direction. Consequently, it is possible to press the anchoring shell, despite the shoulders 4 extending throughout the slot width of the bar, so far axially into bar 1, by simple hand pressure, that shoulders 4 engage the inner surfaces of the lips defining the slot in the bar 1. As can be seen from FIG. 1, the offset edges of neck portion 2b bear against the end edges of the slot, while the supporting surfaces 5 of head portion 2c bear on the outer surfaces of the edges defining the bar slot. Shell 2 is thus secured in bar 1 against dropping out, although the shell may be displaced by hand along bar 1. By screwing a fastening bolt into bar 3, the shell 2 is spread slightly transversely toward the slot edges, and thus fixed on the bar. Such fixing can be increased further by screwing the bolt in until it strikes against the bottom or web of the bar 1.

Figure 3:
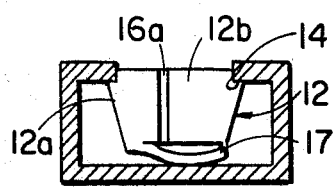
FIGS. 3 and 4 are views, similar to FIGS. 1 and 2, respectively, but illustrating a different form of the anchoring shell.
Figure 4:
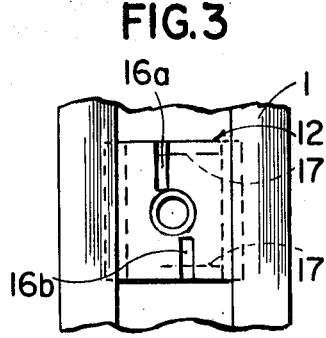
Figure 5:
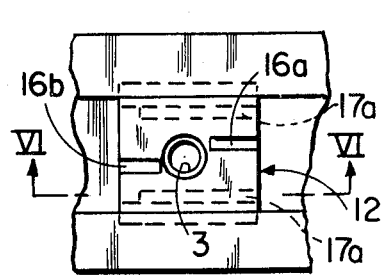
FIG. 5 is a plan view illustrating another embodiment of the shell.

In many cases, a head portion of the anchoring shell projecting outside bar 1 is undesired. FIGS. 3 and 4 show a shell 12 without the head portion projecting from the neck portion 12b. In order to permit a satisfactory pressing of the shell 12 into bar 1, and also to take into consideration bar tolerances, the main body 12a of shell 12 must be slightly shorter than the inside height of bar 1. However, this would not insure a firm seating of the shell in the bar, before the bolt is screwed in. In the embodiment of FIGS. 3 and 4, this firm seating is secured by downwardly curved tongues 17 provided on the bottom of main body 12a of shell 12. These tongues extend in two opposite directions parallel to each other and transversely of the slots 16a and 16b. Elastic tongues 17 press the shell so that its shoulders 14 engage the inside of the slot edges of the bar. This also prevents accidental slight displacement of the shell along the bar. Otherwise, this design of the anchoring shell corresponds to that of the shell shown in FIGS. 1 and 2.

Figure 6:
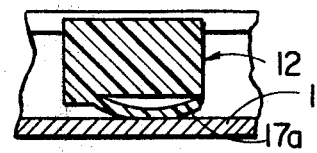
FIG. 6 is a section on the line VI-VI of FIG. 5.

It will be understood that the tongues 17, serving as a sliding safety and as a tolerance equalizer, can also extend parallel to slots 16a as well as transversely thereof, as shown at 17a in FIG. 6. Instead of the tongues being being free at one end, downwardly curved stirrups can be provided to have opposite ends connected with the main body of the shell.

Figure 7:
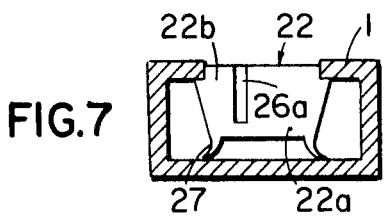
FIGS. 7 and 8 are, respectively, a cross-sectional view and a top plan view of another form of anchoring shell as inserted into a bar.
Figure 8:
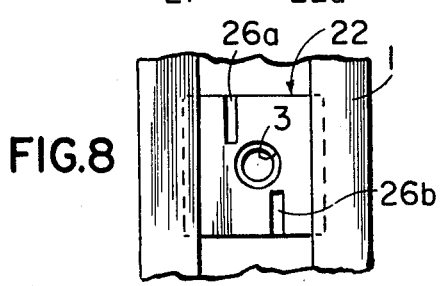

In the embodiment of the invention shown in FIGS. 7 and 8, main body 22a and neck portion 22b of neck 22 are formed in a manner similar to the formation of the corresponding parts of the anchoring shell shown in FIGS. 3—6. The difference here is that downwardly projecting elastic tongues 27 are provided to secure the position of the shell in the bar and to compensate height tolerances of two opposing bottom edges of the shell. Thus, slots 26a and 26b do not terminate directly in central bore 3, but are arranged further to the outside, and are in communication with bore 3 only through prolongations of tangents to bore 3 extending parallel to slots 26a and 26bThe elasticity of the edge parts of the shell formed with the shoulders 4 is thus increased slightly and, at the same time, it is assured that a bolt cannot be forced into slots 26a or 26b even under relatively strong transverse forces on the bolt to be screwed into bore 3.

Figure 9:
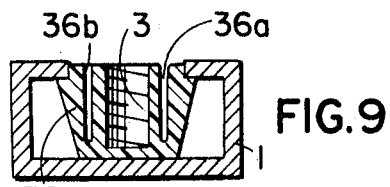
FIGS. 9 and 10 are, respectively, a cross-sectional view and a top plan view of a further embodiment of anchoring shell, in accordance with the invention, as inserted into the bar.
Figure 10:
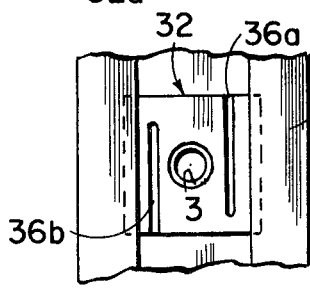

An even greater effect, in this sense, is possible with the arrangement of slots 36a and 36b of the embodiment of the invention shown in FIGS. 9 and 10. These slots extend, from respective opposite sides of the shell, a substantial distance past central bore 3 and do not communicate at all with this bore. Instead of main body 32a of the shell extending close to the bottom of bar 1, as shown in FIG. 9, body 32a can be made shorter and be provided with one of the tolerance equalizing or supporting means 17, 17a or 27, such as shown in FIGS. 3 through 7.

Figure 11:
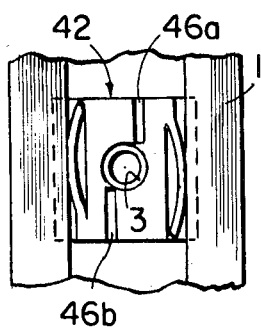
FIG. 11 is a top plan view of the bar with another embodiment of anchoring shell inserted thereinto.

Instead of, or in addition to, these elastic supporting means, which are arranged on the bottom of the main body of the shell in order to assure retention of the pressed-in shell in the bar 1, and independent of additional locking means, elastic supporting means can be provided on the offset sides of the neck portion of the shell as shown, for example, in the embodiment of the invention shown in FIG. 11. The shell 42, shown in FIG. 11, is provided with slightly convex elastic tongues on the offset sides of the neck portion, and these tongues press firmly against the edges of the slot of bar 1 when shell 42 is pressed into the bar. Instead of the slots 46a and 46b shown in FIG. 11, and which correspond to the slots in the embodiments of FIGS. 1 through 4, it is also possible to provide, in the embodiment shown in FIG. 11, slots such as shown in FIGS. 7—10.

Figure 12:
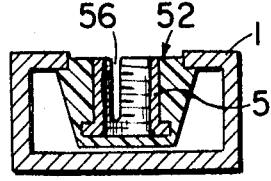
FIG. 12 is a cross-sectional view through the bar and illustrating a further embodiment of anchoring shell.

In the embodiments so far described, central bore 3 of the shell is designed as a threaded bore or as a ribbed bore for screwing a fastening bolt directly into the shell. However, the bolt also could be cast directly into the bore, during manufacture of the shell, by injection molding. A further possibility is shown in FIG. 12. In FIG. 12, a threaded bush 53 is inserted into plastic shell 52, which corresponds to the shell shown in FIG. 1 but without the head portion. Slots 56 are displaced with respect to the central axis and are in communication with the bore receiving the bush 53. This embodiment is particularly suitable for use where higher standards are required. It will be understood that, neither in this embodiment or in the embodiment in which a bolt is cast into the shell during manufacture of the shell, is it possible to attain a spreading of the shell to effect clamping of the neck portion on the edges of the slot in bar 1, as is the case particularly with a ribbed central bore upon subsequent screwing of the bolt into the already pressed-in shell.

In the embodiment of the invention shown in FIGS. 13 through 15, a plastic shell is indicated as 62 as having a rectangular cross section and a central bore 63 formed with an offset. Bore 63 includes an upper entrance cone, and is widened at the offset to form an inner shoulder 65a. The neck portion 62b of shell 62, containing the narrower or lesser diameter part of the bore, is offset, on two opposite sides, to approximately the width of the slot in bar 61, illustrated in dotted lines in FIG. 13. As best seen in FIGS. 13 and 15, the side surfaces of neck portion 62b are formed with bulges 62c which are pressed flat when shell 62 is pressed into bar 61, thus insuring a firm seating of neck portion 62b in the slot of bar 61 despite any dimensional inaccuracies.

The larger diameter central bore part 63a terminates in a square recess 63b. Cam-shaped end projections 63c are provided on two opposite sidewalls of square recess 63b and extend perpendicularly to the offset sides of the neck portion. The slightly wedge-shaped wall portion of shell 62, extending in opposite directions and provided with neck portion offsets, are extended by elastic tongues 67. These tongues extend slightly obliquely outwardly beyond the bottom part of shell 62 containing the recess 63b.

Shell 62 is formed with slots 66, as best seen in FIG. 15, which extend inwardly from the surface of the head and which lie in a plane through the central axis of the shell and extending parallel to the offsets of the neck portion. The slots 66 extending in both directions from the central axis also could be displaced laterally with respect to the central plane. These slots, extending down the bottom part of the shell, make the shell highly elastic transverse to the above-mentioned central plane.

On the bottom side of shell 62, a metal sleeve is inserted into the widened central bore 63a. This sleeve is formed with an interior female thread, and its bottom end is formed with a square flange 73a fitting into the square recess 63b of shell 62. This flange 73a is pressed beyond the elastically flexible projections 63c when sleeve 73 is inserted into the shell until these projections engage beneath flange 73a as shown in FIG. 14, and thus secures sleeve 73, which is always secured against rotation relative to shell 62 by square flange 73a, against dropping out of the shell.

It will be understood that flange 73a could be extended over the entire length of sleeve 73 with a corresponding square design of the entire bore part 633. On the other hand, sleeve 73 also could be designed as a relatively short polygonal metal nut. The length of this metallic entirely threaded insert depends naturally on the desired loading possibility of the anchoring device, as determined by the number of threads.

By slightly compressing the neck portion of shell 62, made highly elastic by slots 66, the shell can be introduced into bar 61 sufficiently far until shoulders 64 engage between the inturned lips of the flanges of the flanges of bar 61. Elastic tongues 67 strike against the bottom of the bar and are deflected outwardly. Shell 62 thus not only is clamped with its neck portion between the edges of the bar lips with cams 62c compensating possible measuring inaccuracies, but also is locked by elastic tongues 67 and shoulders 64 between the bottom of bar 61 and the lips of the bar. This clamping fit of the nut in bar 61 prevents a loose displacement of the shell along the bar, but does not prevent a desired displacement of the shell along the bar.

The anchoring shell of the invention can be produced simply by injection molding. The can be pressed in bodily by hand, that is, without using tools, at any point of a bar having a C-shaped cross section, and are immediately secured against slipping or falling out. The slots insure a higher elasticity of the shell without impairing, in any way, firm seating of the fastening bolt.

What I claim is:

1. An anchoring device, for the disengageable securing of objects to a channel-shaped bar having inturned lips on its flanges, spaced from its base and defining a slot, said anchoring device comprising a plastic shell having a rectangular cross section with an inner end cross-sectional area less than that of its outer end to provide a pair of opposite sidewalls sloping inwardly toward each other, and having means defining a central bolt-receiving bore extending inwardly from its outer end along the longitudinal center line of said shell and inwardly terminating in a bush receiving recess; said shell having a neck portion with two opposite edges offset inwardly to an interspacing substantially equal to the width of the bar slot; said shell being formed with two slots extending inwardly from said outer end to a depth greater than half the length of said shell, parallel to said longitudinal center line and to said offset edges, to provide transverse elastic flexibility of said shell for pressing of said shell into the bar with said offset edges parallel to the edges of the bar slot; said offset edges forming respective shoulders engageable beneath the lips of the bar; said shell having elastic supporting tongue means projecting from its inner end to engage the base of said bar to press said shooulders against the inner surfaces of said lips.

2. An anchoring device, as claimed in claim 1, in which said recess is offset from said central bore to provide a relatively small diameter upper portion in the range of said neck portion and a relatively larger diameter lower portion; a metallic bush being inserted into said relatively larger diameter portion of said bore; said bush having its periphery formed to prevent relative rotation of said bush in said shell; said shell being formed with projections extending transversely to its axis and integral with the shell and providing for pressing of the bush into the central bore of the shell while preventing the bush from falling out of the shell.

3. A fastening device, as claimed in claim 2, in which said bush has a polygonal flange extending in a correspondingly shaped portion of the larger diameter portion of said bore; the lower surface of said flange engaging said projections when said bush is inserted into said shell.

4. An anchoring device, as claimed in claim 3, in which said elastic supporting tongues on its lower portion extend parallel to the offset opposite edges of said neck portion; the lower portion of said bore being rectangular and said projections being on the opposite two sides of said lower portion of said bore.

5. An anchoring device, as claimed in claim 4, in which said plastic shell is formed with slots in a plane including the central axis of said shell, said slots extending parallel to the offset edges of said neck portion and extending from the top to the bottom of said shell.

6. An anchoring device, as claimed in claim 2, in which said metal bush is a polygonal nut inserted in a corresponding polygonal cross section widened portion of said central bore of said shell.